(12) United States Patent
Sundaresan

(10) Patent No.: US 7,039,859 B1
(45) Date of Patent: May 2, 2006

(54) GENERATING VISUAL EDITORS FROM SCHEMA DESCRIPTIONS

(75) Inventor: Neelakantan Sundaresan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 509 days.

(21) Appl. No.: 09/191,281

(22) Filed: Nov. 12, 1998

(51) Int. Cl.
*G06F 15/00* (2006.01)
(52) U.S. Cl. .................................... 715/513; 707/102
(58) Field of Classification Search ............... 707/513, 707/102; 715/513
See application file for complete search history.

(56) References Cited

U.S. PATENT DOCUMENTS

| | | | |
|---|---|---|---|
| 5,185,867 A | 2/1993 | Ito | 717/143 |
| 5,493,678 A | 2/1996 | Arcuri et al. | 707/1 |
| 5,617,578 A | 4/1997 | Kroll et al. | 704/9 |
| 5,640,566 A | 6/1997 | Victor et al. | 717/113 |
| 5,915,259 A * | 6/1999 | Murata | 707/513 |
| 5,920,879 A * | 7/1999 | Kyojima et al. | 715/517 |
| 5,924,101 A * | 7/1999 | Bach et al. | 345/709 |
| 5,926,823 A * | 7/1999 | Okumura et al. | 707/514 |
| 6,272,673 B1 * | 8/2001 | Dale et al. | 717/100 |
| 6,279,015 B1 * | 8/2001 | Fong et al. | 707/513 |

OTHER PUBLICATIONS

Alschuler, Liora, "SoftQuad previews XMetal Prototype", May 1998, The Seybold Report on Internet Publishing, vol 2, No. 9.*

XMetal 1.0, Available at: http://www.webreference.com/html/watch/xmetal.*
Softquad HotMetalPro 3.0 User's Manual, 1996, pp. 77-83.*
W3C Extensible Markup Language (XML) 1.0, Feb. 1998, available: http://www.w3.org/TR/1998/REC-xml-19980210.*
W3C Document Content Description for XML, Jul. 1998, http://www.w3.org/TR/NOTE-dcd.*
W3C Extensible Markup Language (XML) 1.0, Feb. 1998, available: http://www.w3.org/TR/1998/REC-xml-19980210.*
W3C Document Content Description for XML, Jul. 1998, http://www.w3.org/TR/NOTE-dcd.*
Bray, "Extensible Markup Language (XML): Part I. Syntax," http://www.w3.org/TR/WD-xml-lang-970331, Mar. 31, 1997.*

(Continued)

*Primary Examiner*—Heather R. Herndon
*Assistant Examiner*—R. Singh
(74) *Attorney, Agent, or Firm*—Gates & Cooper LLP

(57) ABSTRACT

A visual editor is automatically generated from an eXtensible Markup Language (XML) schema and then used to edit the data contained in corresponding XML documents. The entities within an XML schema are mapped to components of the visual editor, such as forms, widgets, etc., that are generated as class specifications. These class specifications can be customized through the use of a customization specification file, as desired. The class specifications are then instantiated as objects in a Java Virtual Machine to perform the functions of the visual editor.

69 Claims, 7 Drawing Sheets

OTHER PUBLICATIONS

Kirsanov, "XML DTDs and Valid XML Documents," http://www.webreference.com/dlab/books/html/38-3.html, Jun. 16, 1997.*

Bray, "Document Content Description for XML," http://www.w3.org/TR/NOTE-dcd, Jul. 31, 1998.*

Sitt Sen Chok and Kim Marriot, Automatic Construction of User Interfaces from Constraint Multiset Grammars, 11th IEEE International Symposium of Visual Languages, Darmstadt, Germany, Sep. 5-9, 1995, pp. 242-249.

Susan M. Uskudarli and T.M. Dines, "Towards a Visual Programming Environment Generator from Algebraic Specifications", 11th IEEE Interntional Symposium on Visual Languages, Darmstadt, Germany, Sep.5-9, 1995, pp. 234-241.

Jun'ichi Miyao and Shi-kuo Chang, "A Framework of a Visual Language with Dynamic Specification", 11th IEEE International Symposium on Visual Languages, Darmstadt, Germany, Sep. 5-9, 1995, pp. 140-147.

Margaret Burnett and Marla J. Baker, "A Classification System for Visual Programming Languages", Technical Report 93-60-14, Department of Computer Science, Oregon State University Colorado, USA. rev. Jun. 16, 1994, pp. 2-20.

Louis Weitzman and Kent Wittenburg, "Automatic Presentation of Multimedia Documents Using Relational Grammars", in Proceedings of ACM Multimedia '94 (San Francisco, CA, Oct. 15-20, 1994), New York: ACM, 1995, pp. 443-451.

Paul Prescod, "Formalizing SGML and XML Instances and Schemata with Forest Automata Theory", (undated internet publication from http://www.prescod.net/forest/shorttut) 5pp. and relevant bibliography page from OASIS: The SGML/XML Web Page referencing Draft technical paper authored by Paul Prescod entitled: Formalizing XML and SGML Instance with Forest Automata Theory, Waterloo, Ontario: University of Waterloo, Department of Computer Science, May 5, 1998, 1pp.

* cited by examiner

GENERATING VISUAL EDITORS FROM SCHEMA DESCRIPTIONS

CROSS-REFERENCE TO RELATED APPLICATIONS

This application is related to the following co-pending and commonly-assigned patent applications:

Application Ser. No. 09/166,018, now U.S. Pat. No. 6,487,566, entitled "A PATTERN MATCHING AND REPLACEMENT LANGUAGE FOR TRANSFORMING DOCUMENTS," filed on Oct. 5, 1998, by Neelakantan Sundaresan;

Application Ser. No. 09/166,043, now U.S. Pat. No. 6,569,207, entitled "CONVERTING SCHEMAS TO COMPONENT MODELS," filed on Oct. 5, 1998, by Neelakantan Sundaresan; and Application Ser. No. 09/166,042, now U.S. Pat. No. 6,480,865, entitled "A FACILITY FOR ADDING DYNAMISM TO AN EXTENSIBLE MARKUP LANGUAGE," filed on Oct. 5, 1998, by Susan B. Lee and Neelakantan Sundaresan;

All of which applications are incorporated by reference herein.

BACKGROUND OF THE INVENTION

1. Field of the Invention

This invention relates in general to generating visual editors, and in particular, to generating visual editors from eXtensible Markup Language (XML) schemas.

2. Description of Related Art

Extensible Markup Language (XML) is poised to be the next big revolution for the World Wide Web (WWW). With the realization that the Web is not about just browsing any more, XML has emerged as an enabling technology to carry the Web to the next generation of electronic commerce, Web-based workflow, and integration of databases with Web applications.

XML describes a class of data objects called XML documents and partially describes the behavior of computer programs that process them. XML is a restricted form of SGML, the Standard Generalized Markup Language, defined in ISO 8879. The specification for XML can be found at the URL: http://www.w3.org/TR/REC-xml.

XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure.

An XML schema specifies constraints on the structures and types of elements in an XML document. The basic schema for XML is the DTD Document Type Definition). Other XML schema definitions are also being developed, such as DCD (Document Content Definition), XSchema, etc. Information concerning DTD and DCD can be found at the URL: http://www.w3.org/.

The main difference between DTD and DCD is that DTD uses a different syntax from XML, while DCD specifies an XML schema language in XML itself. (XSchema is similar to DCD in this respect). In spite of the differences in the syntax, the goals and constraint semantics for all these XML schema languages are the same. Their commonality is that they all describe XML Schema. This means that they assume the common XML structure, and provide a description language to say how these elements are laid out and are related to each other.

There are about five basic constraints that the XML schema languages describe:

1. The attributes that an element should/may contain:
    a. the types of the attribute values (mainly string types), and
    b. the mandatory or optional nature of occurrences of these attributes.
2. The type and the order in which elements can be contained inside another element (also known as the content model of the element):
    a. the sub-element should be of a certain name or type or that a sub-element could be of any type,
    b. a regular expression system to express how these elements occur, wherein this regular expression system can be expressed by the following operators:
        i. |: A|B (either element of type A or of type B can occur),
        ii.,: A, B (element of type B follows one of type A),
        iii. *: A* (zero or more occurrence of element of type A),
        iv. +: A+ (One or more occurrence of element of type A),
        v. ?: A? (zero or one occurrence of element of type A),
        vi. ( ): ( . . . ) (grouping of expressions in this system).

Note that this system includes some convenience operators. For example, A+ is the same as A, A*.

A software module called an XML processor is used to read XML documents and provide access to their content and structure. It is assumed that an XML processor is doing its work on behalf of another module, called the application. The XML specification located at the URL noted above describes the required behavior of an XML processor in terms of how it must read XML data and the information it must provide to the application.

As XML becomes more extensively used in Web applications, large numbers of XML documents will be created, communicated between applications, and stored into and retrieved from repositories. The volume of XML documents will likely be larger than the current volume of HTML (HyperText Markup Language) documents, because XML documents can be seamlessly integrated with applications.

Unlike HTML documents, which are read only by Web browsers, XML documents can be read and processed by any number of different applications. Moreover, since XML is extensible, there may many different schemas for XML documents for different domains and different applications within a domain, unlike HTML, which has a single schema.

There is a need in the art then for editors that provide users with a facility to create and/or edit XML documents. Of course, the construction of editors is well known in the art. Consider, for example, U.S. Pat. No. 5,640,566, entitled "Method of forming an editor", U.S. Pat. No. 5,493,678, entitled "Method in a structure editor", U.S. Pat. No. 5,185,867, entitled "Method and apparatus for automatically generating software specifications", and U.S. Pat. No. 5,617,578, entitled "Computer-based workstation for generation of logic diagrams from natural language text structured by the insertion of script symbols". However, none of the references teach or suggest a visual editor that simplifies a user's interaction with XML documents, or an automatic tool for the generation of visual editors for use with specific XML schemas and that are generated from such XML schemas.

SUMMARY OF THE INVENTION

To overcome the limitations in the prior art described above, and to overcome other limitations that will become apparent upon reading and understanding the present specification, the present invention discloses a visual editor that is automatically generated from an extensible Markup Language (XML) schema and then used to edit the data contained in corresponding XML documents. The entities within an XML schema are mapped to components of the visual editor, such as forms, widgets, etc., that are generated as class specifications. These class specifications can be customized through the use of a customization specification file, as desired. The class specifications are then instantiated as objects in a Java Virtual Machine to perform the functions of the visual editor.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The preferred embodiment of the present invention describes a system for automatically generating visual editors for XML documents from XML schemas for the XML documents. Because most XML schemas are described as Document Type Definitions (DTDs), the preferred embodiment of the present invention concentrates on DTD-based XML schemas, although alternative embodiments describe how to convert schemas based on Document Content Definitions (DCDs), XSchema, etc. For the components of the visual editors, the preferred embodiment of the present invention focuses on Java objects, since Java is commonly used in the context of the Web, although an alternative embodiment could use other programming languages.

Hardware Environment

Figure 1:
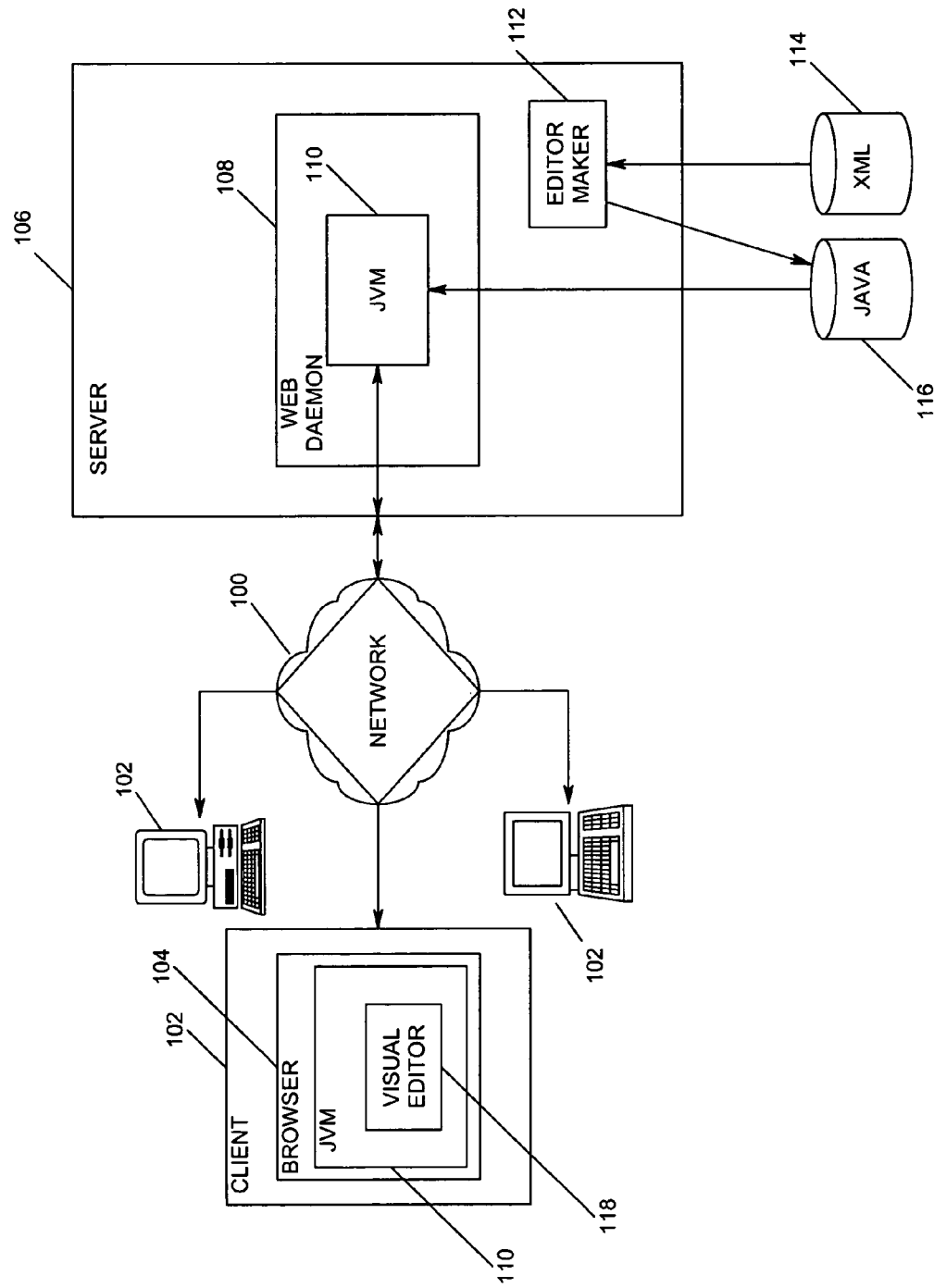
FIG. 1 schematically illustrates an exemplary hardware environment that could be used with the preferred embodiment of the present invention.

FIG. 1 schematically illustrates an exemplary hardware environment that could be used with the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include networks such as LANs, WANs, SNA networks, as well as the Internet.

Either or both of the Web browser 104 and Web daemon 108 may include a Java Virtual Machine (JVM) 110 that executes Java objects, applets, scripts, etc., associated with various Web content. The server system 106 may further include one or more Editor Makers 112 that use XML schemas and documents 114 to create Java class specifications that are instantiated as Java objects 116 that comprise components of a visual editor 118 for XML documents.

In general, the Editor Maker 112, XML schemas and documents 114, class specifications and objects 116, and visual editors 118 comprise data and/or logic which, when read and executed by a computer, cause the computer to perform the steps for performing and/or using the present invention. Generally, the data and/or logic are embodied in and/or readable from a device, carrier or media, such as memory, data storage devices, and/or remote devices coupled to the computer via data communications devices.

However, those skilled in the art will recognize that the exemplary environment illustrated in FIG. 1 is not intended to limit the present invention. Indeed, those skilled in the art will recognize that other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

Operation of the Editor Maker

Figure 2:
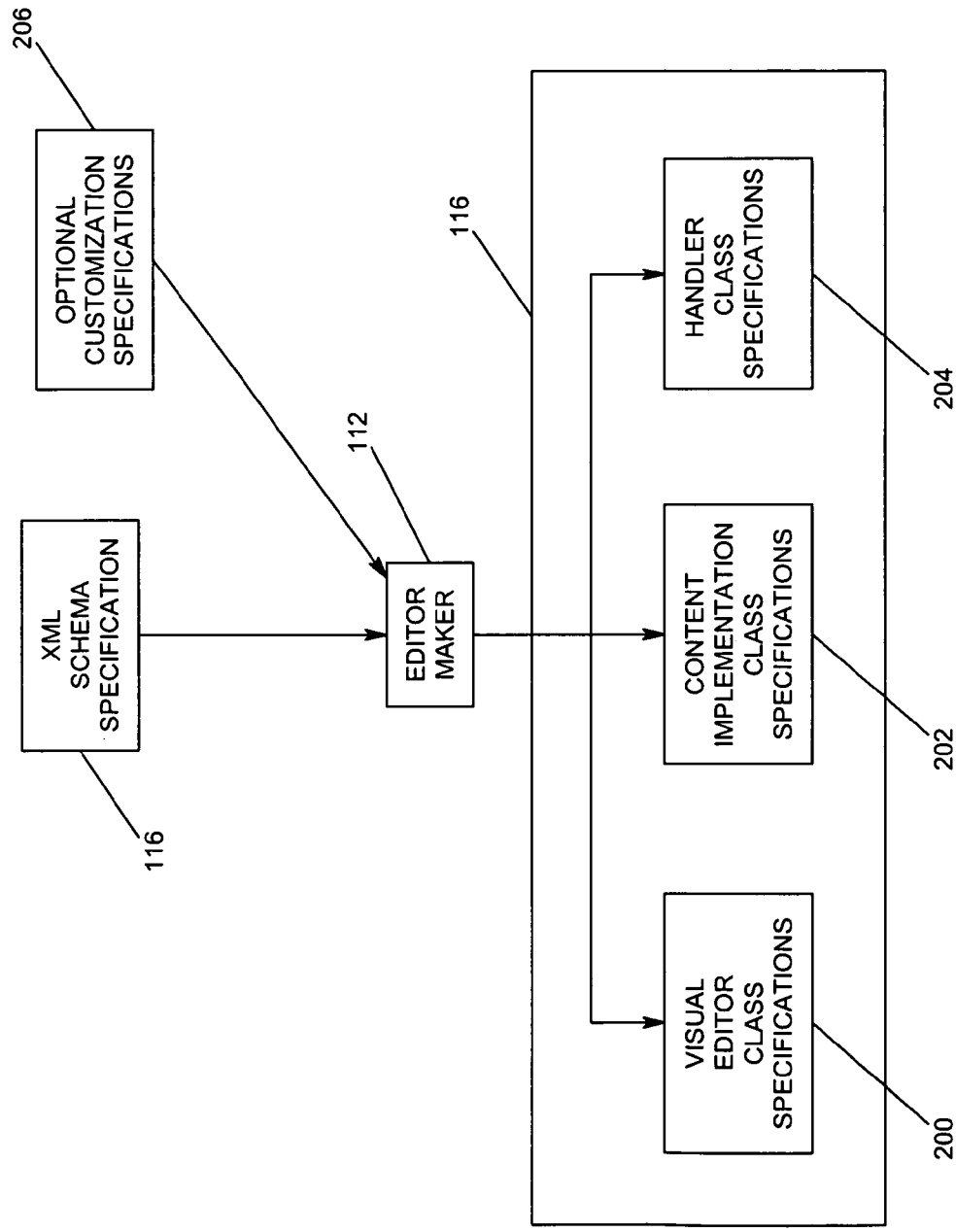
FIG. 2 illustrates the operation of the Editor Maker according to the preferred embodiment of the present invention.

FIG. 2 illustrates the operation of the Editor Maker 112 according to the preferred embodiment of the present invention. The Editor Maker 112 maps an XML schema 116 (e.g., a dtd file named "foo.dtd" with a root element "bar") to components of a visual editor 118, such as forms, widgets, etc., that are generated as visual editor 118 class specifications 200 (e.g., BarEditor.java) the comprise the components of the visual editor 118, content implementation class specifications 202 (e.g., Bar.java) that comprise components of the of XML schemas and documents, and handler class specifications 204 (e.g., BarHandler.java) that comprise initiators for the visual editor 118. These class specifications 200, 202, 204 can be customized through the use of a customization specification file 206, as desired. The class specification 200, 202, 204 are then instantiated as objects in a Java Virtual Machine 110 (either on the server 104 or the client 102) 118.

In operating the visual editor 118, users would not need to know the specifics of the structure of the XML document or the XML schema. Instead, users would simply operate the visual editor 118 to fill in forms, interact with widgets and other components of the visual editor 118, and the visual editor 118 would, in turn, would create and/or edit the XML documents.

Elements

At the simplest level, the Editor Maker 112 associates a panel widget with an element. For example, the Editor Maker 112 generates a panel editor widget for an element definition of the form:

<!ELEMENT A . . . >

For each element $B_i$ occurring inside element A, the Editor Maker 112 associates a button in the panel corresponding to A. When this button is selected the panel associated with $B_i$ is shown for editing the $B_i$ element.

Consider the following content model:

<!ELEMENT OUTER (INNER1, INNER2)>
<!ATTLIST OUTER
   ATTR1 CDATA #REQUIRED
   ATTR2 CDATA #REQUIRED>
<!ELEMENT INNER1 . . . >
<!ELEMENT INNER2 . . . >

Figure 3:
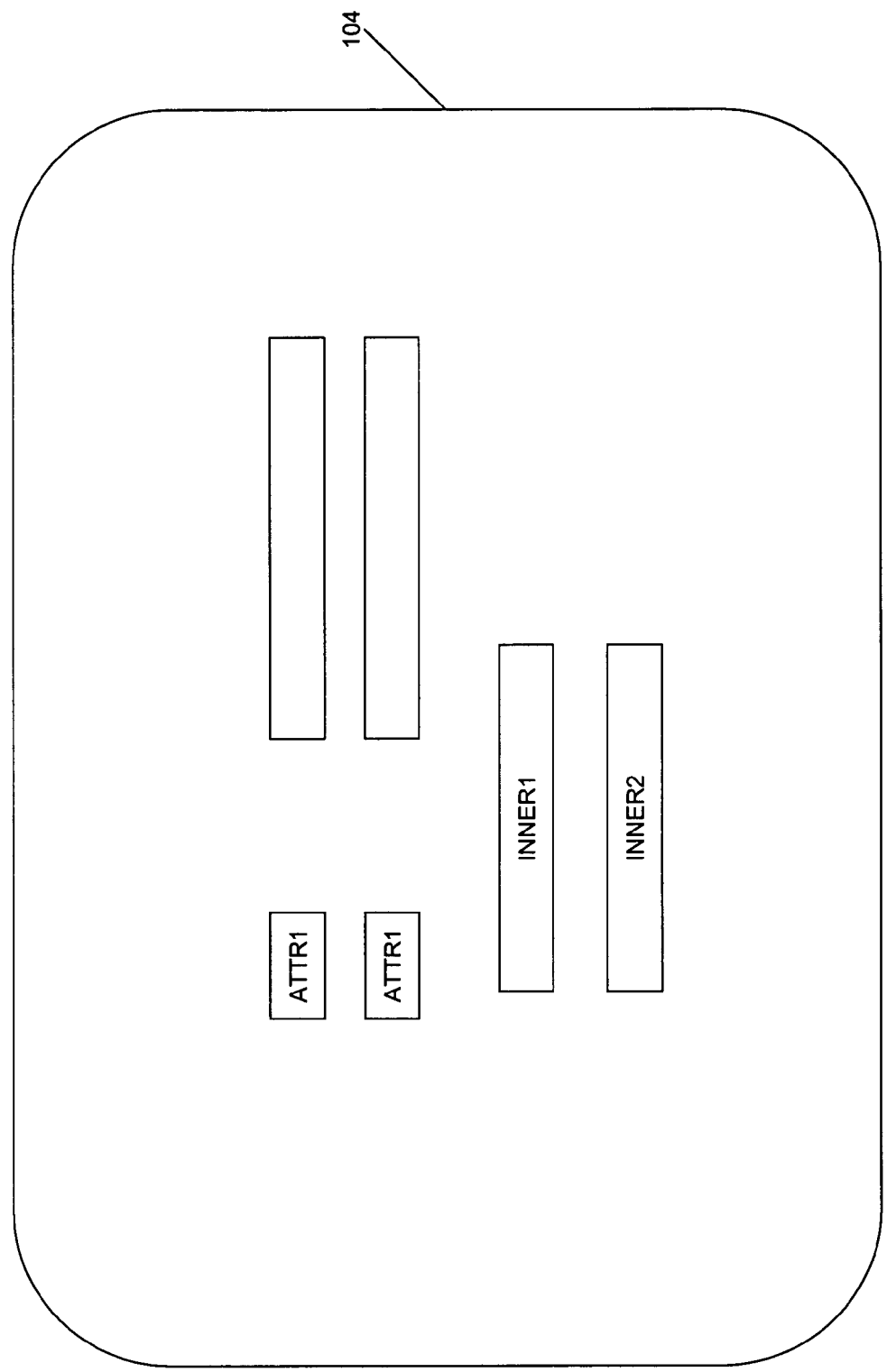
FIG. 3 illustrates a panel widget as it would be displayed by the browser on the client computer according to the preferred embodiment of the present invention.

The panel widget generated for "OUTER", as it would be displayed by the browser 104 on the client computer 102, is shown in FIG. 3. Selecting the INNER1 button widget would display the panel for INNER1, while selecting the INNER2button widget would display the panel for INNER2.

Attributes

Since attribute values in XML can only be text, an attribute needs only a text editor widget in the visual editor 118. The Editor Maker 112 generates a pair of widgets for each attribute, including a label widget (bearing the attribute name) and the text editor widget. To differentiate between text editor widgets for different attributes, a label widget is associated with the text editor widget, wherein the label is the name of the attribute in the preferred embodiment (other labels could be used in alternative embodiments).

The text editor widget provided by the Editor Maker 112 allows a user to input values for the attribute. In DTD, an attribute may have three different declarations: mandatory (#REQUIRED), optional (#IMPLIED), or fixed value (#FIXED). Attributes can also be of different types: NMTOKEN, STRING, etc.

For user input, the text editor widget performs two functions:

1. The text editor widget allows the user to enter a value only if the attribute is declared to be IMPLIED or REQUIRED. For FIXED attributes, the text editor widget uses the value specified in the DTD and does not permit the user to change this value.

2. The text editor widget validates the values entered by the user against the different possible types of the attributes.

Since editing is an incremental process, the text editor widget does not require that the user enter a value for every attribute that is declared to be REQUIRED. However, the user can invoke a validation call to have the text editor widget to check and verify that all the attributes that are REQUIRED have indeed been entered.

Consider the following example DTD:

<!ENTITY % bool "(true|false)">
<!ATTLIST A
   ATTR1 CDATA #IMPLIED
   ATTR2 % bool #REQUIRED
   ATTR3 CDATA #FIXED "YES">

Figure 4:
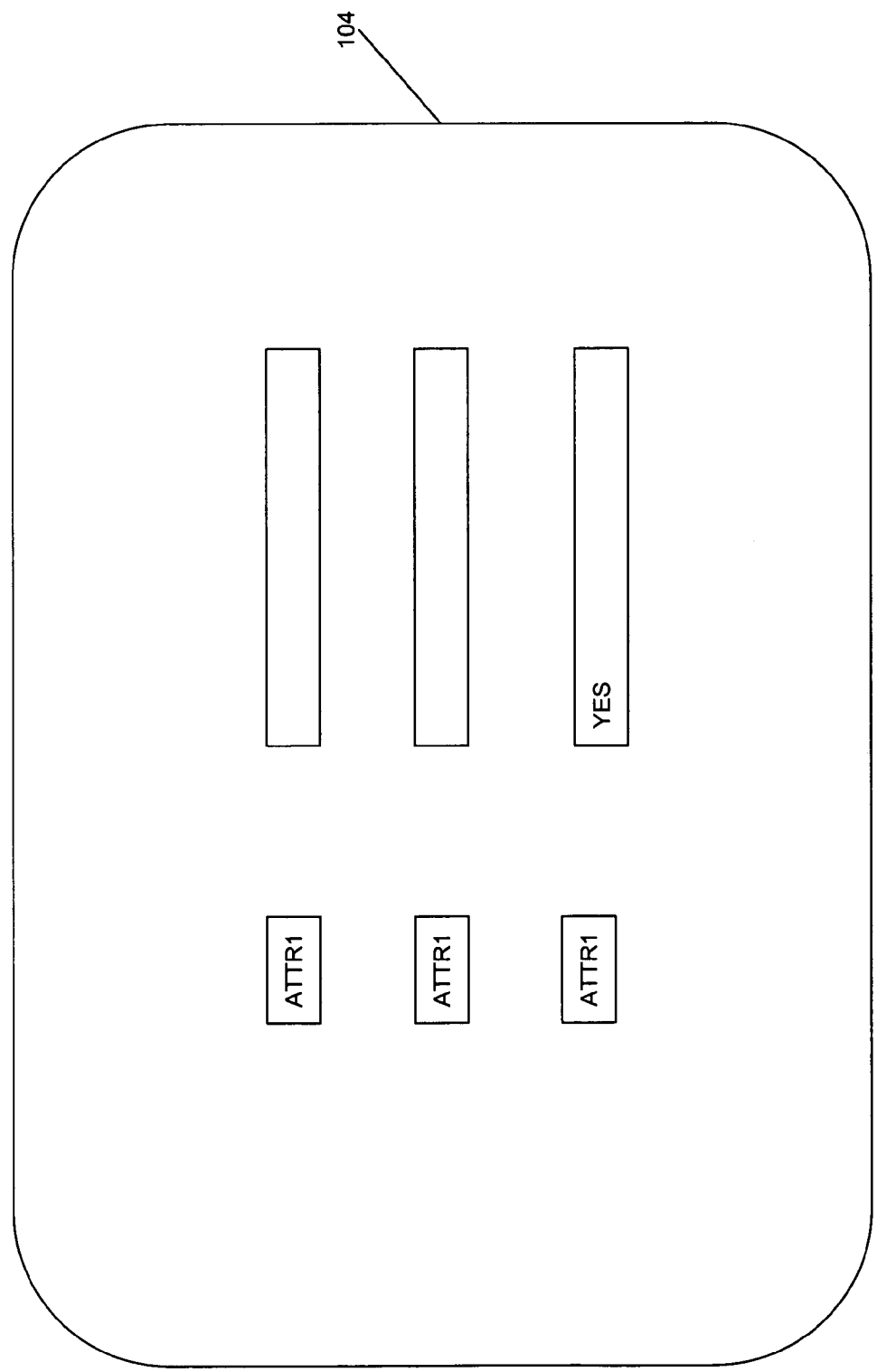
FIG. 4 illustrates three pairs of widgets (label widget, text editor widget) for three attributes as they would be displayed by the browser on the client computer according to the preferred embodiment of the present invention.

For this example DTD, the Editor Maker 112 generates three pairs (label widget, text editor widget) for these three attributes, as shown in FIG. 4. The boxes labeled ATTR1, ATTR2, and ATTR3 are label widgets, and each label widget is adjacent a text editor widget that it labels. The text editor widget associated with ATTR1 would allow the user to enter any string, the text editor widget associated with ATTR2 would allow the user to enter only the values "true" or "false", and the text editor widget associated with ATTR3 would only display a value and would not allow the user to change the value.

As an alternative, since the text editor widget associated with ATTR2 can accept only an enumerated number of values, it could be replaced by a "choice" widget that displays all possible values so that the user can select one of the values. Similarly, the text editor widget associated with ATTR3 could be replaced by a label widget, since the user cannot enter a value for ATTR3.

Zero Or One: B?

When an element A has a content model that includes B?, the Editor Maker 112 associates a button in A's panel for B. This is the same as the case when B is in the content model of A.

Zero/One Or More: B* or B+

Figure 5:
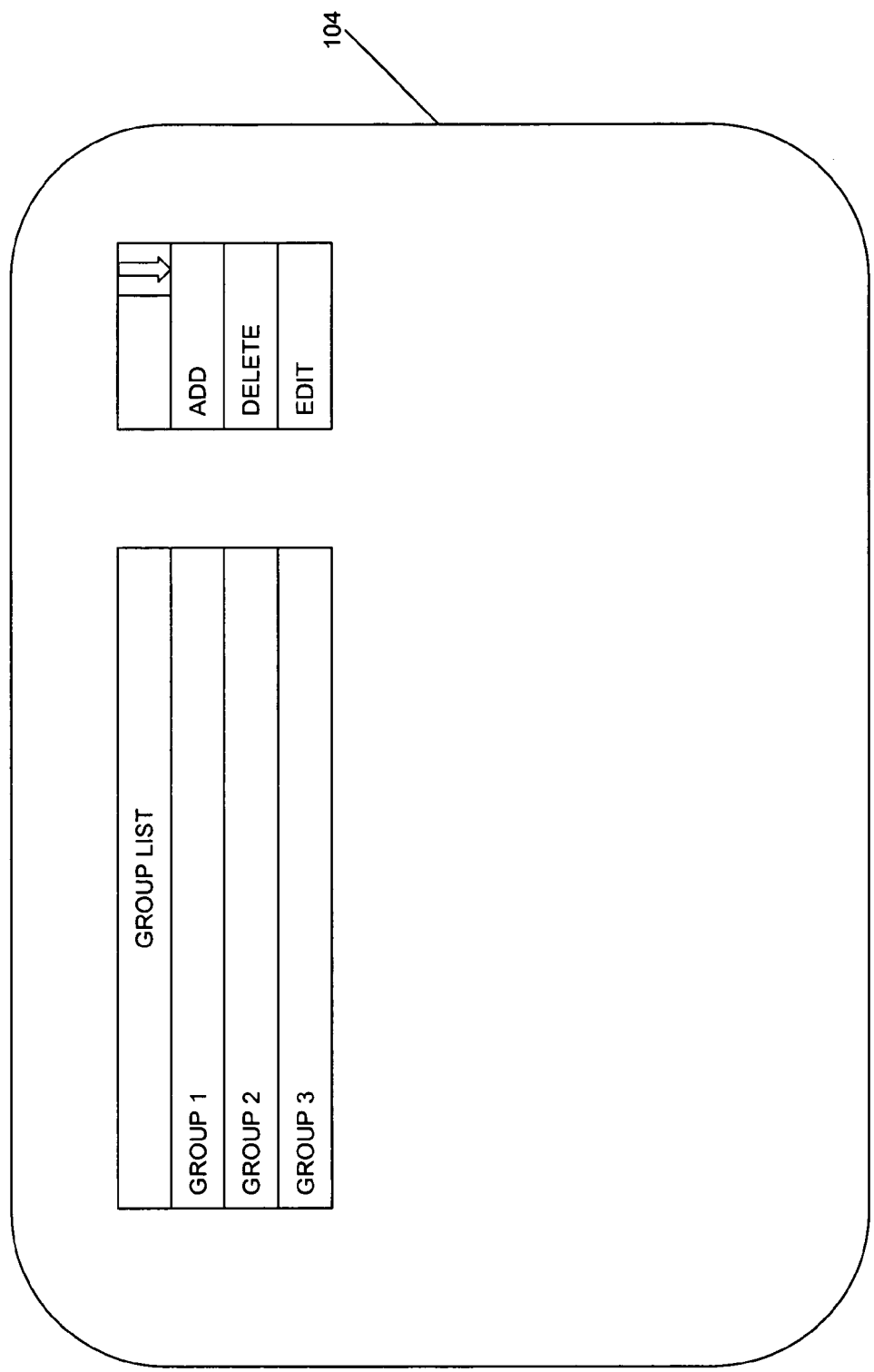
FIG. 5 illustrates two widgets (a list widget and a choice widget) as they would be displayed by the browser on the client computer according to the preferred embodiment of the present invention.

Regular expressions such as B*, B+ that indicate multiple instances of an element result in indexed properties. When a content model contains expressions of the form B* or B+, the Editor Maker 112 associates two widgets with the content model: (1) a list widget that displays a list of widgets; and (2) a choice widget, as illustrated in FIG. 5.

The list widget of the visual editor 118 is generated for the following content model:

<!ELEMENT group_list (group)*>
<!ATTLIST group_list
   attr1 CDATA #REQUIRED>
<!ELEMENT group . . . >

The choice widget includes three choices: Add, Delete, or Edit. These choices allow the user to add an element of type B to the list, delete an element of type B from the list, or edit a member in the list, respectively.

1. To add a member of type B, the user selects the Add choice and an empty panel related to a B element is displayed.
2. To delete an element from the list, the user chooses a particular element in the list and selects "Delete" from the choice widget. The user can select multiple elements in the list to be deleted at the same time.
3. To edit an element, the user selects an element and the panel associated with the element is displayed.

Note that instead of deleting and editing through the choice menu, an action event may be associated with the list widget, so that when a user selects a particular item, a pop-up menu for add, delete or edit is displayed.

One Or The Other: A|B

When an element has a content model of the form A|B, the Editor Maker 112 translates this to a choice widget. The user can select one of the two and the associated edit panel is displayed.

Figure 6:
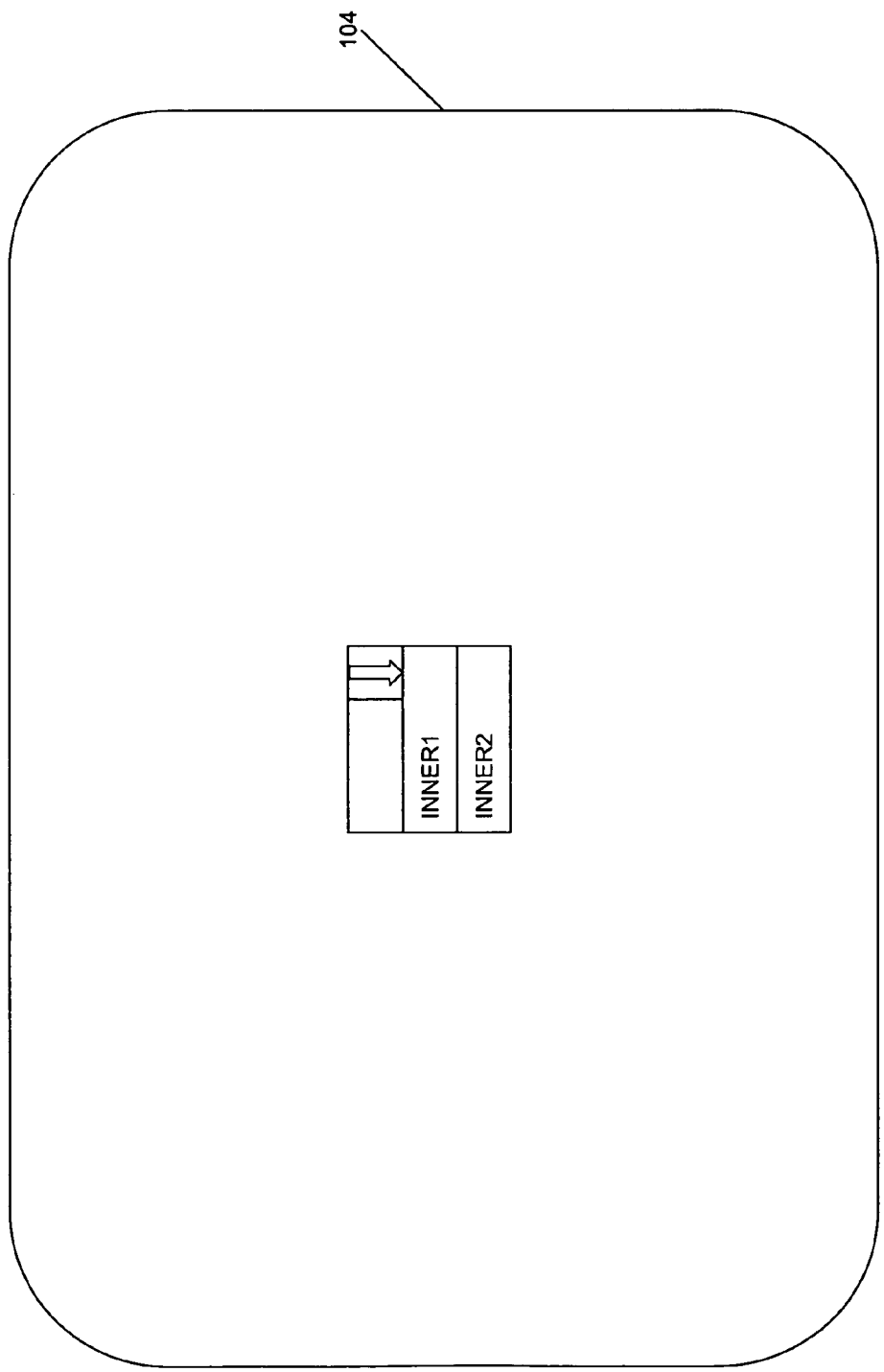
FIG. 6 illustrates a panel widget as it would be displayed by the browser on the client computer according to the preferred embodiment of the present invention.

FIG. 6 illustrates the panel widget of the visual editor 118 that is generated for the following content model:

<!ELEMENT (INNER1 |INNER2)>

One Followed by the Other: A, B

For this content model, a button is displayed for each of the elements in the sequence in a panel widget for the parent element.

Figure 7:
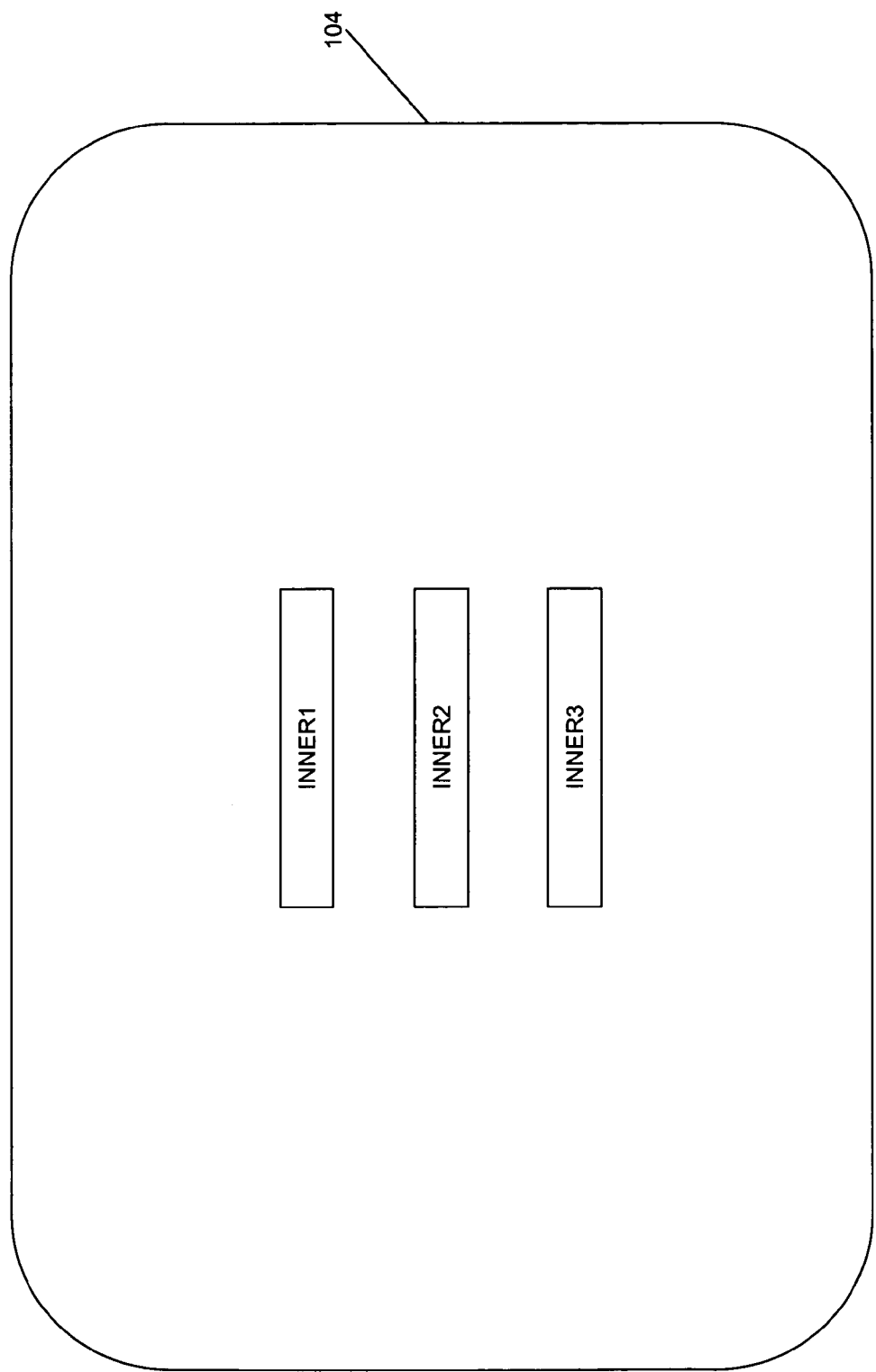
FIG. 7 illustrates a panel widget as it would be displayed by the browser on the client computer according to the preferred embodiment of the present invention.

FIG. 7 illustrates the panel widget of the visual editor 118 that is generated for the following content model:

<!ELEMENT OUTER (INNER1, INNER2, INNER3)>

Selecting any of the buttons displays the element panel associated with corresponding element.

Grouping: (A)

Grouping is often used to group a plurality of elements in the content model to jointly apply any of the above-mentioned operators, such as?, *, +, etc., to the members of the group jointly, thus overriding any default precedence conditions. As described above, FIG. 5 illustrates the list widget of the visual editor 118 that is generated for the grouping content model.

It is possible to put all the button widgets corresponding to a group in a panel. However, grouping is often used for clarity and unnecessarily creating a grouping panel might result in too many widgets. This is especially true with situations such as ((A)), where unnecessary parentheses are introduced.

The ANY Content Model

An ANY content model in the DTD indicates that the element itself can contain elements of any type, i.e., the content model is "open". For this content model, the visual editor 118 displays the XML document, so that the user can edit the XML document directly. The visual editor 118 may also provide a tree editor for the XML document, wherein the tree editor is a structural editor that assists the user in entering well-formed structures into the XML document.

The EMPTY Content Model

For the EMPTY content model, the only properties displayed by the visual editor 118 are text editor widgets for its attributes. If there are no attributes, i.e., then no panel is displayed for the element (selecting the button corresponding to the element in the containing panel does nothing).

The PCDATA Content Model

The PCDATA content model results a text editor widget where the user types in text corresponding to the PCDATA. The text editor widget checks that XML tag characters, such as '<', '>', etc., are not present in the PCDATA, unless the data is specified as a CDATA. Also, the text editor widget provides a toggle mechanism to wrap the PCDATA around in a CDATA.

Optimization

The Editor Maker 112 attempts to solve a number of correctness, optimization, and aesthetics related issues when generating the visual editor 118 from the XML schema.

For example, often when the application developer specifies A, B in the content model, they mean ((A, B)|(B, A)). Sometimes, the application developer specifies this explicitly, but, when the list gets long and complicated, for example, as in A*, B?, C+, the application developer has to specify explicitly numerous combinations (in the example, six combinations) and may inadvertently omit some combinations.

The Editor Maker 112 automatically generates these combinations by default. Thus, when it sees A, B, it automatically assumes B, A as well.

However, this may not be a correct assumption in all situations. The Editor Maker 112 tries to be careful when it makes these assumption. For example, when some element occurs multiple times in a sequence, for example, as A in -A, B, A-, it converts that element to an A+ content model (thus generating a list editor for the occurrences of A). However, it introduces an additional constraint in the list editor that a user cannot enter more than two instances of A (as is the case in the original content model), because the generated editor would indicate an error if such an event occurred.

The Editor Maker 112 also eliminates unnecessary grouping parentheses.

Generating Visual Editors for Different Regular Expression Operators

The application developer can customize the visual editors 118 for different regular expression operators using the customization specification file 206.

Consider the following example DTD:

<!ELEMENT editor EMPTY>
<!ATTLIST editor

| OR | CDATA #IMPLIED |
| GROUP | CDATA #IMPLIED |
| COMMA | CDATA #IMPLIED |
| STAR | CDATA #IMPLIED |
| PLUS | CDATA #IMPLIED |
| For-PCDATA | CDATA #IMPLIED |
| For-ATTRS | CDATA #IMPLIED |
| For-ANY | CDATA #IMPLIED |
| For-EMPTY | CDATA #IMPLIED> |

In the customization specifications file 206, the application developer can identify the specific widgets implementations for the Editor Maker 112. An example of this would be the following:

<editor For-ATTRS="java.awt.TextArea"/>

Using the above specification, the Editor Maker 112 generates a TextArea widget for the attribute using the identified implementation.

Name Generation For Elements

In an alternative embodiment, the Editor Maker 112 also allows element-by-element or attribute-by-attribute customization using the customization specifications file 206. For example, the DTD in the customization specifications file 206 for element name generation could be the following:

<!ELEMENT editor-generator (triple)*>
<!ELEMENT tripleEMPTY>
<!ATTLIST triple
    content-name CDATA #REQUIRED
    type "(Attribute|Element)" #IMPLIED
    editor-name CDATA #REQUIRED>

Consider the following example content model:

<!ELEMENT Outer (Inner1, Inner2)>
<!ATTLIST Outer
    attr CDATA #IMPLIED>

The application developer can provide a customization specification of the following form:

<editor-generator>
    <triplet name="Outer"
        editor-name="java.awt.List"
        type="element"/>
    <triplet name="Inner1"
        editor-name="java.awt.TextArea"
        type="element"/>
    <triplet name="Inner2"
        editor-name="myEditor.Foo"
        type="element"/>
    <triplet name="attr"
        type="attribute"
        editor-name="java.awt.TextArea"/>
</editor-generator>

The application developer can also customize the names for class specifications using the following DTD:
```
<!ELEMENT class-names EMPTY>
<!ATTLIST class-names
    editor-class CDATA #IMPLIED
    content-class CDATA #IMPLIED
    handler-class CDATA #IMPLIED>
```
For example, the application developer can specify the names MyEditor, MyImpl, MyHandlers, respectively, for the three classes discussed above, using the following XML specification:
```
<class-names editor-class="MyEditor"
    content-class="MyImpl"
    handler-class="MyHandlers"/>
```
The application developer can also specify the package name for the classes in the customization specifications file 206. By default, the Editor Maker 112 names the package after the name of the DTD file used to generate the classes. If the application developer can change the name of package using the following DTD:
```
<!ELEMENT generated-package EMPTY>
<!ATTLIST generated-package
    name CDATA #REQUIRED>
```
For example, the application developer can specify that the generated classes should belong to the package "com.ibm.almaden.gcsConfig" using the following XML specification:
```
<generated-package
name="com.ibm.almaden.gcsConfig"/>
```

Using the Visual Editors to Validate Content

The visual editor 118 generated by the Editor Maker 112 provides the functionality where the user can ask the visual editor 118 to validate an element or ask questions as to what are the possible values at some point of the editing process. The former enables the user to create partially valid documents, while the latter enable hint-based editing.

Even though the visual editor 118 includes the functionality to validate a XML document, the user may wish to save a partially created XML document. This file will be well-formed, but may not be valid.

Interaction with Other Tools

In addition, the visual editor 118 can be made to interface to other classes, for example, the classes generated by the BeanMaker described in co-pending and commonly-assigned application Ser. No. 09/166,043, entitled "CONVERTING SCHEMAS TO COMPONENT MODELS," filed on Oct. 5, 1998, by Neelakantan Sundaresan, which application is incorporated by reference herein. In one embodiment, the visual editor 118 can be used to automatically generate Java Beans.

CONCLUSION

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by specific document or programming languages, and could comprise languages other than XML and Java. For example, the present invention could also be used with HTML, SGML, NetRexx, VisualBasic Script, XML, Perl, C, C++, Cobol, etc.

In summary, the present invention discloses a method, apparatus, and article of manufacture for automatically generating a visual editor from an eXtensible Markup Language (XML) schema and then using the visual editor to edit the data contained in corresponding XML documents. The entities within an XML schema are mapped to components of the visual editor, such as forms, widgets, etc., that are generated as class specifications. These class specifications can be customized through the use of a customization specification file, as desired. The class specifications are then instantiated as objects in a Java Virtual Machine to perform the functions of the visual editor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implement method for generating a document editor, comprising:
   (a) generating one or more class specifications in the computer from a schema for the document, wherein the class specifications identify user interface components of the editor corresponding to entities defined in the schema; and
   (b) instantiating one or more objects in the computer from the class specifications to invoke the editor.

2. The method of claim 1 above, wherein the documents are eXtensible Markup Language (XML) documents and the schemas are XML schemas.

3. The method of claim 2 above, wherein the schemas are selected from a group including Document Type Definition (DTD) schemas, Document Content Definition (DCD) schemas, and XSchema schemas.

4. The method of claim 1 above, wherein the class specifications comprise Java class specifications.

5. The method of claim 1 above, wherein the generating step further comprises converting an entity defined in the schema into the class specification.

6. The method of claim 1 above, wherein the generating step further comprises the step of generating the class specifications in the computer from the schemas and one or more optional customization specifications.

7. The method of claim 6 above, wherein the optional customization specifications define what class names to generate for each entity defined in the schema.

8. The method of claim 1 above, wherein the class specifications include one or more specifications selected from a group comprising (1) a visual editor class specification, (2) a content implementation class specification, and a handler class specification.

9. The method of claim 1 above, further comprising mapping the entities defined in the schema to components of the editor.

10. The method of claim 1 above, wherein the entities are selected from a group comprising elements and attributes of elements.

11. The method of claim 10 above, wherein the attribute has a declaration selected from a group comprising mandatory, optional, and fixed value.

12. The method of claim 11 above, further comprising accepting user input for attributes having a mandatory declaration.

13. The method of claim 11 above, further comprising accepting user input for attributes having an optional declaration.

14. The method of claim 11 above, further comprising entering values from the schema for attributes having a fixed value declaration.

15. The method of claim 10 above, further comprising validating values entered for the attribute.

16. The method of claim 1 above, wherein the class specifications include at least one function for validating at least one entity defined in the schema.

17. The method of claim 1 above, wherein the generating step further comprises the step of generating the class specifications from a regular expression language comprising one or more declarations of elements enclosed within an element.

18. The method of claim 17 above, wherein the regular expression language includes one or more regular expression operators selected from a group comprising:
 (1) a "zero or more" operator,
 (2) a "one or more" operator,
 (3) a "one or the other" operator,
 (4) a "one followed by the other" operator,
 (5) a "zero or one" operator,
 (6) a "grouping" operator, and
 (7) an "any" operator.

19. The method of claim 18 above, wherein the class specifications define one or more widgets that are associated with each of the operators.

20. The method of claim 1 above, wherein the class specifications define at least one widget associated with an entity in the schema.

21. The method of claim 1 above, further comprising identifying specific widget implementations for use with the editor.

22. The method of claim 1 above, further comprising customizing the editor for use with different regular expression operators.

23. The method of claim 1 above, further comprising attempting to solve correctness, optimization, or aesthetics related issues when generating the visual editor from the schema.

24. A computer-implemented apparatus for generating a document editor, comprising:
 (a) a computer; and
 (b) an editor maker, executed by the computer, for generating one or more class specifications in the computer from a schema for the document, wherein the class specifications identify user interface components of the editor corresponding to entities defined in the schema, and for instantiating one or more objects in the computer from the class specifications to invoke the editor.

25. The apparatus of claim 24 above, wherein the documents are eXtensible Markup Language (XML) documents and the schemas are XML schemas.

26. The apparatus of claim 25 above, wherein the schemas are selected from a group including Document Type Definition (DTD) schemas, Document Content Definition (DCD) schemas, and XSchema schemas.

27. The apparatus of claim 24 above, wherein the class specifications comprise Java class specifications.

28. The apparatus of claim 24 above, wherein the means for generating further comprises means for converting an entity defined in the schema into the class specification.

29. The apparatus of claim 24 above, wherein the means for generating further comprises means for generating the class specifications in the computer from the schemas and one or more optional customization specifications.

30. The apparatus of claim 29 above, wherein the optional customization specifications define what class names to generate for each entity defined in the schema.

31. The apparatus of claim 24 above, wherein the class specifications include one or more specifications selected from a group comprising (1) a visual editor class specification, (2) a content implementation class specification, and a handler class specification.

32. The apparatus of claim 24 above, further comprising means for mapping the entities defined in the schema to components of the editor.

33. The apparatus of claim 24 above, wherein the entities are selected from a group comprising elements and attributes of elements.

34. The apparatus of claim 33 above, wherein the attribute has a declaration selected from a group comprising mandatory, optional, and fixed value.

35. The apparatus of claim 34 above, further comprising means for accepting user input for attributes having a mandatory declaration.

36. The apparatus of claim 34 above, further comprising means for accepting user input for attributes having an optional declaration.

37. The apparatus of claim 34 above, further comprising means for entering values from the schema for attributes having a fixed value declaration.

38. The apparatus of claim 33 above, further comprising means for validating values entered for the attribute.

39. The apparatus of claim 24 above, wherein the class specifications include at least one function for validating at least one entity defined in the schema.

40. The apparatus of claim 24 above, wherein the means for generating further comprises means for generating the class specifications from a regular expression language comprising one or more declarations of elements enclosed within an element.

41. The apparatus of claim 40 above, wherein the regular expression language includes one or more regular expression operators selected from a group comprising:
 (1) a "zero or more" operator,
 (2) a "one or more" operator,
 (3) a "one or the other" operator,
 (4) a "one followed by the other" operator,
 (5) a "zero or one" operator,
 (6) a "grouping" operator, and
 (7) an "any" operator.

42. The apparatus of claim 41 above, wherein the class specifications define one or more widgets that are associated with each of the operators.

43. The apparatus of claim 24 above, wherein the class specifications define at least one widget associated with an entity in the schema.

44. The apparatus of claim 24 above, further comprising means for identifying specific widget implementations for use with the editor.

45. The apparatus of claim 24 above, further comprising means for customizing the editor for use with different regular expression operators.

46. The apparatus of claim 24 above, further comprising means for attempting to solve correctness, optimization, or aesthetics related issues when generating the visual editor from the schema.

47. An article of manufacture embodying logic for performing a method for generating a document editor for use in an object-oriented computer system, the method comprising the steps of:

(a) generating one or more class specifications from a schema for the document, wherein the class specifications identify user interface components of the editor corresponding to entities defined in the schema; and (b) instantiating one or more objects from the class specifications to invoke the editor.

48. The method of claim 47 above, wherein the documents are eXtensible Markup Language (XML) documents and the schemas are XML schemas.

49. The method of claim 48 above, wherein the schemas are selected from a group including Document Type Definition (DTD) schemas, Document Content Definition (DCD) schemas, and XSchema schemas.

50. The method of claim 47 above wherein the class specifications comprise Java class specifications.

51. The method of claim 47 above, wherein the generating step further comprises converting an entity defined in the schema into the class specification.

52. The method of claim 47 above, wherein the generating step further comprises the step of generating the class specifications in the computer from the schemas and one or more optional customization specifications.

53. The method of clam 52 above, wherein the optional customization specifications define what class names to generate for each entity defined in the schema.

54. The method of claim 47 above, wherein the class specifications include one or more specifications selected from a group comprising (1) a visual editor class specification, (2) a content implementation class specification, and a handler class specification.

55. The method of claim 47 above, further comprising mapping the entities defined in the schema to components of the editor.

56. The method of claim 47 above, wherein the entities are selected from a group comprising elements and attributes of elements.

57. The method of claim 56 above, wherein the attribute has a declaration selected from a group comprising mandatory, optional, and fixed value.

58. The method of claim 57 above, further comprising accepting user input for attributes having a mandatory declaration.

59. The method of claim 57 above, further comprising accepting user input for attributes having an optional declaration.

60. The method of claim 57 above, further comprising entering values from the schema for attributes having a fixed value declaration.

61. The method of claim 56 above, further comprising validating values entered for the attribute.

62. The method of claim 47 above, wherein the class specifications include at least one function for validating at least one entity defined in the schema.

63. The method of claim 47 above, wherein the generating step further comprises the step of generating the class specifications from a regular expression language comprising one or more declarations of elements enclosed within an element.

64. The method of claim 63 above, wherein the regular expression language includes one or more regular expression operators selected from a group comprising:

(1) a "zero or more" operator, (2) a "one or more" operator, (3) a "one or the other" operator, (4) a "one followed by the other" operator, (5) a "zero or one" operator, (6) a "grouping" operator, and (7) an "any" operator.

65. The method of claim 64 above, wherein the class specifications define one or more widgets that are associated with each of the operators.

66. The method of claim 47 above, wherein the class specifications define at least one widget associated with an entity in the schema.

67. The method of claim 47 above, further comprising identifying specific widget implementations for use with the editor.

68. The method of claim 47 above, further comprising customizing the editor for use with different regular expression operators.

69. The method of claim 47 above, further comprising attempting to solve correctness, optimization, or aesthetics related issues when generating the visual editor from the schema.

* * * * *